April 2, 1963 M. W. FROHARDT 3,083,575
INSTRUMENT SYSTEMS
Filed March 20, 1959
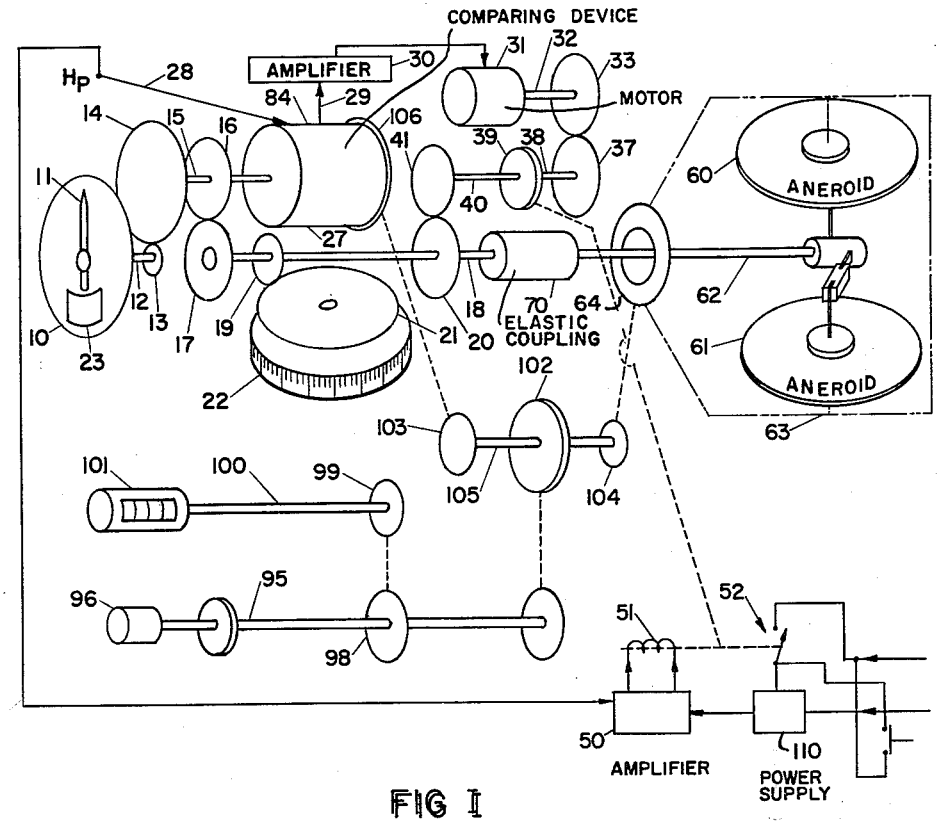
FIG I
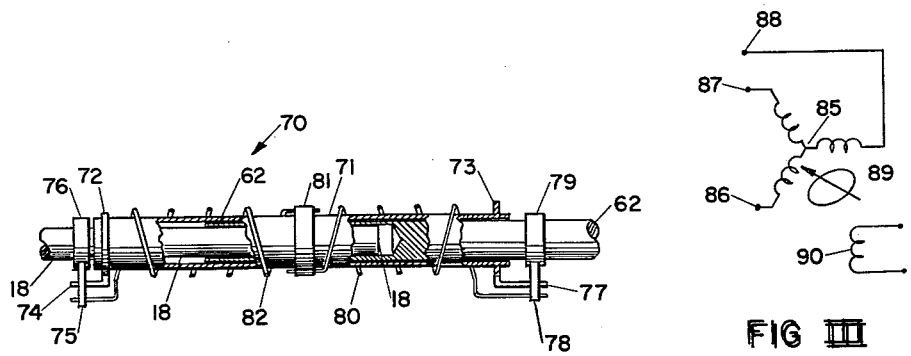
FIG II
FIG III
INVENTOR.
MELVIN W. FROHARDT
BY
ATTORNEY

United States Patent Office

3,083,575
Patented Apr. 2, 1963

3,083,575
INSTRUMENT SYSTEMS
Melvin W. Frohardt, Bettendorf, Iowa, assignor to The Bendix Corporation, a corporation of Delaware
Filed Mar. 20, 1959, Ser. No. 800,766
2 Claims. (Cl. 73—334)

This invention relates to improvements in instrument systems. It relates more particularly to instruments in which information is furnished by electrical means and alternatively, if the electrical means fails, by a standby sensor to a readout element.

In aircraft instrumentation, for example, operation of aircraft at higher speeds and altitudes and with increased maneuverability requires more precise indication of flight conditions. The simple functions previously sensed by instruments now need compensation for others. Thus an altimeter, previously responsive only to altitude pressure, must be compensated for attitude and speed. To avoid duplication of precision sensors in each indicator, air-data computers are provided to accurately sense most of the required flight information and to combine this information in electrical signals which are transmitted to engine and flight controls and to panel display indicators as required. Less sophisticated, individualized standby instruments must be provided in case the central air-data computer or one of its signals should fail.

Among the objects of this invention is the provision of a system by which the standby instrument may utilize the same readout element, such for example as a display system, normally operated from a remotely positioned sensing system both to avoid duplication of the readout elements and so that, in the case where the readout element comprises a display system, on failure of the remote sensor or its signal transmission or translation means, the pilot can find the required information displayed at the same familiar point on his panel.

Another object is the provision of improved and novel means for connecting a standby sensor to a readout element including means for insuring initial correspondence between the readout intelligence and the sensed state of the condition as well as subsequent variation of the readout intelligence in accordance with changes in the state of the condition detected by the standby sensor.

The invention is particularly advantageous in connection with altitude indication and another object is to provide an improved altimeter system. A related object is to provide improved means for adjusting both the prime and standby means for supplying altitude information to an altitude display to account for barometric pressures.

Various other objects and advantages of the invention will hereinafter be apparent. The invention being advantageously employed in altitude indication, an altimeter system embodying the invention and in which the readout element or indicator is a display system has been selected for description and illustration in the accompanying drawing, it being understood that various modifications in the system shown and other modifications, including modifications not limited to altitude indication, are possible without departing from the spirit of the invention and the scope of the appended claims.

In the drawing:

FIG. 1 is a schematic diagram of an altimeter system embodying the invention;

FIG. 2 is a view in elevation with cut away portions shown in central section, of a coupling for inclusion in the system shown in FIG. 1; and FIG. 3 is a schematic diagram of a signal comparison unit for inclusion as part of the electromotive system of the system shown in FIG. 1.

Referring to FIG. 1, the altimeter system there shown comprises a display mechanism, electromotive means coupled to drive the display mechanism, a standby altimeter, barometric setting input mechanism connected to both the electromotive means and the standby altimeter, and means for coupling the standby altimeter to the display mechanism.

Advantageously, as shown, the display mechanism comprises a dial 10 and associated pointer 11, a pointer shaft 12 carrying a gear 13 in mesh with a gear 14 carried by a shaft 15 along with a gear 16 which meshes with a gear 17 carried by a shaft 18 which also carries gears 19 and 20. Gear 19 meshes with a gear 21 carried by a drum 22 visible through a window 23 in dial 10. The dial and drum carry indicia representing altitude.

The display mechanism is actuated by one or more of its elements herein termed the driver. In the embodiment illustrated the display mechanism may be driven at either or both of driver shafts 15 and 18 or at any one or more of the gears. As shown, the display is driven by electromotive means comprising a comparing device 27 effective to compare rotation of shaft 15 with an electrical signal designated $H_p$ and representing altitude. This signal is transmitted by an electrical connection 28 to device 27 and there compared, as hereinafter explained, with the position of shaft 15, and a signal representing any difference is transmitted via connection 29 to an amplifier 30. After amplification the difference signal is applied to an electromotive means, advantageously the motor 31. Converted to rotation of the motor shaft 32, the difference signal is applied in turn through gears 33 and 37, shaft 38, normally disengaged magnetic clutch 39, shaft 40 and gear 41 to the gear 20 on shaft 18. Thus these elements numbered 27 through 41 combine with the display mechanism to form a servo loop or system effective, when clutch 39 is engaged, to actuate the display mechanism according to the difference between the display and $H_p$ signal representations until they correspond.

Means are provided for opening the servo loop in the event of malfunctioning in the primary display actuating system. As shown, at the lower portion of FIG. 1, the numeral 50 designates an amplifier to which energizing signals are applied. The electrical output of this amplifier is applied to the coil 51 of a relay 52 which, when energized, completes power connections to the system and maintains clutch 39 engaged. The energizing signals applied to the amplifier 50 represent the electrical signal $H_p$ and energization of the electrical phase of the system within allowable voltage and frequency limits. The latter signal is applied as an electrical power input to amplifier 50 from power supply 110. Upon failure of any one or more of these signals, the relay coil 51 is deenergized, electrical power is removed from the electrical system and clutch 39 is disengaged to interrupt the servo system or loop.

Advantageously the standby altimeter comprises a mechanical altimeter of any suitable type and, as shown, may comprise a pair of aneroids 60 and 61 subjected to ambient pressure and coupled to drive an output shaft 62 as they expand and contract as a result of ambient pressure changes incident to changes in altitude. The altimeter aneroids 60 and 61 are carried by a rotatable element designated by dotted lines 63. The rotatable element carries a gear 64 by which the altimeter, aneroids with output shaft and all, may be rotated whereby rotation of the shaft 62 may be effected without change in the connection from shaft 62 to the aneroids.

The numeral 70 designates means operative upon failure in the electrical phase of the system, for completing effective driving connections between the display mechanism and standby altimeter. It is entirely possible, if the electrical system fails, that the display mechanism may have been driven electrically to indicate an altitude different than the altitude represented by the rotational position of the standby altimeter shaft 62. Hence means are also provided, within means 70, for actuating or repositioning the display mechanism into correspondence with the rotational position of the standby altimeter output shaft.

This means 70 advantageously has the form illustrated in FIG. 2 wherein shaft 18 of the display mechanism is shown telescoped in the axially bored end of the standby altimeter output shaft 62. Both of shafts 18 and 62 are surrounded by a cylindrical sleeve 71 having flanges 72 and 73 formed at its ends where shafts 18 and 62 emerge, respectively. Each of these flanges carries an arm extending in the direction of its associated shaft 18 and 62 and is engageable with a stop carried by said shafts. Thus stop arm 74 of flange 72 is engageable with arm 75 formed as an extension of a collar 76 carried by shaft 18 adjacent the point at which the shaft enters sleeve 71. Similarly stop arm 77 of flange 73 is engageable with an arm 78 formed as an extension of a collar 79 carried by shaft 62 adjacent the point at which this shaft enters sleeve 71. A spring 80, having one end secured to a flange 81, formed on the outer surface of sleeve 71 intermediate its ends, is wound around sleeve 71 and is fixed at its other end to arm 78. Another spring 82 is secured at one end of flange 81 and, after winding around sleeve 71 in a direction opposite to that of spring 80, is secured at its other end to arm 75. Springs 80 and 82 act to urge relative rotation of shafts 18 and 62, one clockwise and the other counterclockwise, until arms 75 and 78 engage stops 74 and 77, respectively, at which time the two shafts are arranged in axial correspondence.

In normal operation of the system, shaft 62 is held in a given rotational position corresponding to altitude sensed by the standby altimeter. If the electrical signal $H_p$ corresponds to a different altitude, which may occur because the signal $H_p$ may be corrected for various flight parameters, the electromotive system will apply a torque to shaft 18 and the latter will rotate out of the position shown in FIG. 2 to store a force in springs 80 and 82 corresponding to the degree of rotational displacement of shaft 62 relative to shaft 18. Looking toward the flexible coupling 70 along its rotational axis, if shaft 18 is rotated clockwise, arm 75 is moved away from stop 74 carrying with it the associated end of spring 82. This motion tends to wind spring 82 thus transmitting the force to sleeve 71 which is held against rotation by stop 77 which engages the arm 78 on shaft 62. Thus upon clockwise rotation of shaft 18 a force is stored in spring 82 which will return shaft 18 to original position with arm 75 against stop 74 upon termination of application of torque to shaft 18.

If a torque is applied to effect counterclockwise rotation of shaft 18, arm 75 drives against stop 74 effecting clockwise rotation of sleeve 71 to carry stop 77 away from arm 78 on shaft 62 but tends to unwind and store a restoring force in spring 80.

In the absence of any torque at shaft 18, as when clutch 39 is disengaged, the mechanism will return arms 75 and 78 against stops 74 and 77, respectively, whereby the rotational position of shafts 18 and 62 will correspond, as shown, and the display mechanism will be actuated to indicate the altitude corresponding to the rotational position of shaft 62. Thereafter, until electrical control of the display mechanism is reinstituted, shafts 18 and 62 and the coupling 70 will rotate as a unit in accordance with rotation of shaft 62.

Advantageously, the comparing device 27 is any one of a well known type in which relative rotational position of portions of the structure together with the character of an energizing signal determine the character of an output signal. The device 27 is one of this type and is represented diagrammatically in FIG. 3. The three phase star connected windings 85 are wound on a circular stator carried by a housing 84 and are energized by alternating currents applied to terminals 86, 87, and 88, as by an Autosyn, to create a magnetic field whose direction indicates the altitude $H_p$. Within this field lies a conductive loop 89 connected for rotation by shaft 15, as indicated by the arrow. The loop is arranged so that current induced therein varies with rotational position of the loop relative to the field and it is further arranged so that its current flow creates a field which induces an electrical signal in a winding 90. Thus the signal induced in winding 90 varies with the relative rotational position of shaft 15 and housing 84 and the signal $H_p$ applied at terminals 86, 87, and 88. It is this signal which is transmitted via connection 29, its magnitude being zero when the position of shaft 15 relative to case 84 corresponds to the signal $H_p$.

Altimeters indicate height above a reference surface, usually sea level or the altitude level of an airport relative to sea level. It is desirable that the instrument be adjustable to change the reference and this is done as is well understood in the art by altering the effect produced by the altitude sensing elements in accordance with the barometric pressure current at the reference level.

Means in the form of a barometric pressure-setting mechanism are provided for making such adjustments simultaneous in the primary electrical system and in the standby altimeter regardless of which of these is actuating the display mechanism. Advantageously this means effects simultaneous rotation of the case 84 of the comparing element 27 relative to shaft 15 and of altimeter shaft 62. It may comprise, as shown, a shaft 95 manually rotatable by rotation of a barometric pressure-setting element or knob 96. A gear 98 carried by shaft 95 meshes with a gear 99 carried by the shaft 100 of a counter 101 marked to indicate barometric pressures corresponding to rotation of shaft 95.

Another gear carried by shaft 95 meshes with a gear 102 carried with gears 103 and 104 on a shaft 105. Gear 104 meshes with the gear 64, previously described. Gear 103 meshes with a gear 106 fixed to housing 84 of the electromotive element 27. Hence upon rotation of shaft 95, housing 84 is rotated with respect to shaft 15 and altimeter element 63 is rotated to rotate shaft 62 to provide the barometric reference change as previously described.

I claim:

1. In an altimeter system, first and second rotatable elements, an elastic coupling interconnecting said first and second elements, a rotatable barometric pressure setting element, a movable indicating means connected to said first element, means jointly responsive to signals representing altitude and the rotational position of said setting element for rotating said second element to a position corresponding to a function of altitude, electromotive means jointly responsive to the rotational position of said setting element and an electrical signal variable with altitude for driving said first element to a position corresponding to a function of altitude, means responsive to failure of said electrical signal for rendering said electromotive means ineffective to drive said first element, said elastic coupling being effective when said electromotive means is so rendered ineffective for rotating said first element into rotational correspondence with said second element.

2. In an altimeter system, a rotatable driver, a movable display mechanism connected to said driver for movement thereby, electromotive means having an output shaft coupled to said driver for rotating said driver, said electromotive means being responsive to changes in electrical signals representing altitude to rotate said driver, means sensitive to altitude pressure and having an output shaft rotatably positioned in accordance with altitude, and means including an elastic coupling interconnecting said driver and said last mentioned output shaft and being responsive to failure of said electromotive means for rotating said driver to correspondence with said last mentioned output shaft.

References Cited in the file of this patent

UNITED STATES PATENTS

| | | |
|---|---|---|
| 2,508,983 | Winchel | May 23, 1950 |
| 3,009,358 | Angus | Nov. 21, 1961 |